US012684334B2

(12) United States Patent
Mariyani et al.

(10) Patent No.: US 12,684,334 B2
(45) Date of Patent: ***Jul. 14, 2026

(54) INTERNET PROTOCOL MULTIMEDIA SUBSYSTEM (IMS) BASED ON A SHARED SUBSCRIBER PROFILE

(71) Applicant: T-MOBILE INNOVATIONS LLC, Overland Park, KS (US)

(72) Inventors: Anil Kumar Mariyani, Ashburn, VA (US); Subramania Kaushik, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 313 days.

This patent is subject to a terminal disclaimer.

(21) Appl. No.: 18/463,939

(22) Filed: Sep. 8, 2023

(65) Prior Publication Data

US 2025/0088839 A1     Mar. 13, 2025

(51) Int. Cl.
H04W 8/20     (2009.01)
H04L 65/1016     (2022.01)

(52) U.S. Cl.
CPC ........... H04W 8/20 (2013.01); *H04L 65/1016* (2013.01)

(58) Field of Classification Search
CPC ............................... H04W 76/27; H04W 8/20
See application file for complete search history.

(56) References Cited

U.S. PATENT DOCUMENTS

| | | | |
|---|---|---|---|
| 8,046,381 B2 | 10/2011 | Cai et al. | |
| 8,644,460 B2 | 2/2014 | Tai et al. | |
| 8,861,404 B2 | 10/2014 | Cai et al. | |
| 8,918,526 B2 | 12/2014 | Tai et al. | |
| 9,059,948 B2 | 6/2015 | Schaedler et al. | |
| 2008/0275883 A1 | 11/2008 | Ashraf et al. | |
| 2010/0229192 A1* | 9/2010 | Marilly ................. | H04L 67/306 725/34 |
| 2018/0332441 A1* | 11/2018 | Shaw .................... | H04L 41/122 |
| 2019/0238345 A1 | 8/2019 | Gage | |
| 2020/0374687 A1* | 11/2020 | Hua ........................ | H04W 8/12 |
| 2022/0295266 A1 | 9/2022 | Chang et al. | |
| 2024/0121613 A1* | 4/2024 | Kahn ................... | H04W 12/35 |
| 2024/0121699 A1 | 4/2024 | Agcaoili et al. | |

* cited by examiner

*Primary Examiner* — Margaret G Webb

(57) ABSTRACT

An Internet Protocol Multimedia Subsystem (IMS) serves an IMS service to user communication devices based on individual subscriber profiles and a shared subscriber profile. The individual subscriber profiles and the shared subscriber profile are stored. The IMS serves the IMS service to the user communication devices based on the individual subscriber profiles. When an individual subscriber profile is unavailable for a user communication device, the IMS serves the IMS service to the user communication device based on the shared subscriber profile.

20 Claims, 8 Drawing Sheets

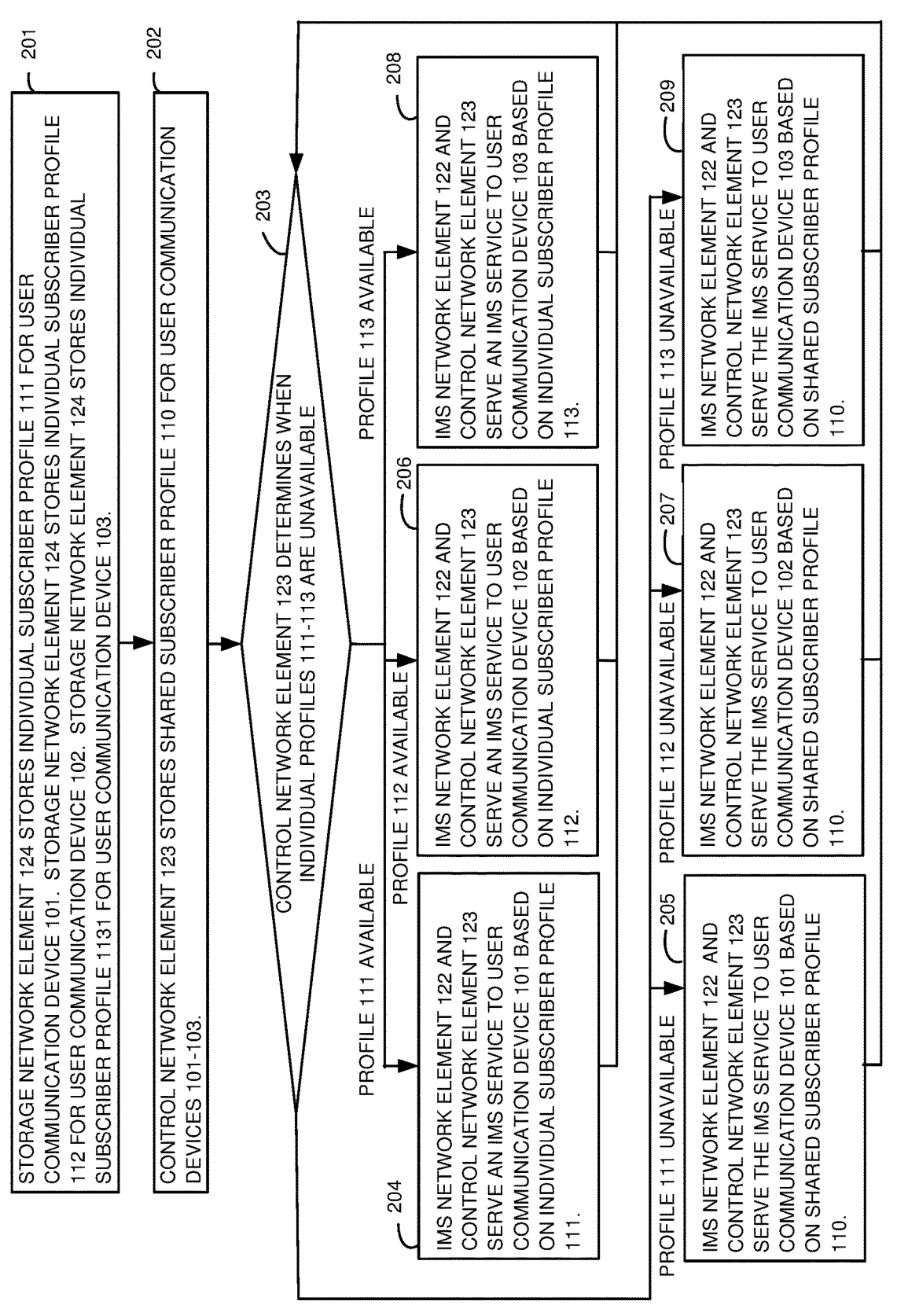

STORAGE NETWORK ELEMENT 124 STORES INDIVIDUAL SUBSCRIBER PROFILE 111 FOR USER COMMUNICATION DEVICE 101. STORAGE NETWORK ELEMENT 124 STORES INDIVIDUAL SUBSCRIBER PROFILE 112 FOR USER COMMUNICATION DEVICE 102. STORAGE NETWORK ELEMENT 124 STORES INDIVIDUAL SUBSCRIBER PROFILE 1131 FOR USER COMMUNICATION DEVICE 103. — 201

CONTROL NETWORK ELEMENT 123 STORES SHARED SUBSCRIBER PROFILE 110 FOR USER COMMUNICATION DEVICES 101-103. — 202

CONTROL NETWORK ELEMENT 123 DETERMINES WHEN INDIVIDUAL PROFILES 111-113 ARE UNAVAILABLE — 203

PROFILE 111 AVAILABLE

PROFILE 112 AVAILABLE — 206

PROFILE 113 AVAILABLE — 208

IMS NETWORK ELEMENT 122 AND CONTROL NETWORK ELEMENT 123 SERVE AN IMS SERVICE TO USER COMMUNICATION DEVICE 101 BASED ON INDIVIDUAL SUBSCRIBER PROFILE 111. — 204

IMS NETWORK ELEMENT 122 AND CONTROL NETWORK ELEMENT 123 SERVE AN IMS SERVICE TO USER COMMUNICATION DEVICE 102 BASED ON INDIVIDUAL SUBSCRIBER PROFILE 112.

IMS NETWORK ELEMENT 122 AND CONTROL NETWORK ELEMENT 123 SERVE AN IMS SERVICE TO USER COMMUNICATION DEVICE 103 BASED ON INDIVIDUAL SUBSCRIBER PROFILE 113.

PROFILE 111 UNAVAILABLE

PROFILE 112 UNAVAILABLE — 207

PROFILE 113 UNAVAILABLE — 209

IMS NETWORK ELEMENT 122 AND CONTROL NETWORK ELEMENT 123 SERVE THE IMS SERVICE TO USER COMMUNICATION DEVICE 101 BASED ON SHARED SUBSCRIBER PROFILE 110. — 205

IMS NETWORK ELEMENT 122 AND CONTROL NETWORK ELEMENT 123 SERVE THE IMS SERVICE TO USER COMMUNICATION DEVICE 102 BASED ON SHARED SUBSCRIBER PROFILE 110.

IMS NETWORK ELEMENT 122 AND CONTROL NETWORK ELEMENT 123 SERVE THE IMS SERVICE TO USER COMMUNICATION DEVICE 103 BASED ON SHARED SUBSCRIBER PROFILE 110.

FIGURE 2

INTERNET PROTOCOL MULTIMEDIA SUBSYSTEM (IMS) BASED ON A SHARED SUBSCRIBER PROFILE

TECHNICAL BACKGROUND

An Internet Protocol Multimedia Subsystem (IMS) provides data communication services to user communication devices like phones and computers. The data communication services include voice calling, video calling, data messaging, or some other multimedia communication product. The IMS typically delivers the IMS services to the user communication devices over wireless communication networks that use Wireless Fidelity (WIFI) and Fifth Generation New Radio (5GNR).

The IMS comprises network elements like Call State Control Functions (CSCFs) and Application Servers (AS) that control the IMS services that are delivered to the user communication devices. The IMS also uses network elements like Home Subscriber Servers (HSSs) and Unified Data Repositories (UDRs) that provide data access and storage. For example, a CSCF interacts with an HSS to select an AS for a user communication device. The HSS gets data from the UDR to make this selection. In particular, the UDR stores individual profiles for each IMS user—referred to as a subscriber. The subscriber profiles control the IMS services for the individual subscribers. For example, an individual subscriber profile indicates the IMS services that are authorized for an individual subscriber. When the UDR is unavailable due to an overload or some other reason, then the HSS cannot obtain these individual subscriber profiles and the delivery of the IMS services to the individual subscribers is disrupted.

The massive growth of subscribers to IMS services has caused a corresponding growth in the individual subscriber profiles that are stored in the UDR. Unfortunately, the UDRs may get overloaded or otherwise fail due to this massive growth. Moreover, the IMS services may be denied to subscribers when their individual subscriber profiles are not available from the faulty UDRs. The data communication networks do not provide adequate IMS service availability to subscribers when faced with UDR access issues.

TECHNICAL OVERVIEW

In some examples, an Internet Protocol Multimedia Subsystem (IMS) serves an IMS service to user communication devices based on individual subscriber profiles and a shared subscriber profile. The individual subscriber profiles and the shared subscriber profile are stored. The IMS service is served to the user communication devices based on the individual subscriber profiles. When an individual subscriber profile is unavailable for a user communication device, the IMS service is served to the user communication device based on the shared subscriber profile.

In some examples, an IMS serves an IMS service to user communication devices based on individual subscriber profiles and a shared subscriber profile. The IMS comprises a Uniform Data Repository (UDR) and a Home Subscriber Server (HSS). The UDR stores the individual subscriber profiles, and the HSS stores the shared subscriber profile. The HSS and an IMS element serve the IMS service to the user communication devices based on the individual subscriber profiles. The HSS determines when an individual subscriber profile is unavailable for a user communication device. In response, the HHS and the IMS element serve the IMS service to the user communication device based on the shared subscriber profile.

DESCRIPTION OF THE DRAWINGS

FIG. 2 illustrates an exemplary operation of the data communication system to serve the IMS service to the user communication devices based on the individual subscriber profiles and the shared subscriber profile.

DETAILED DESCRIPTION

Figure 1:
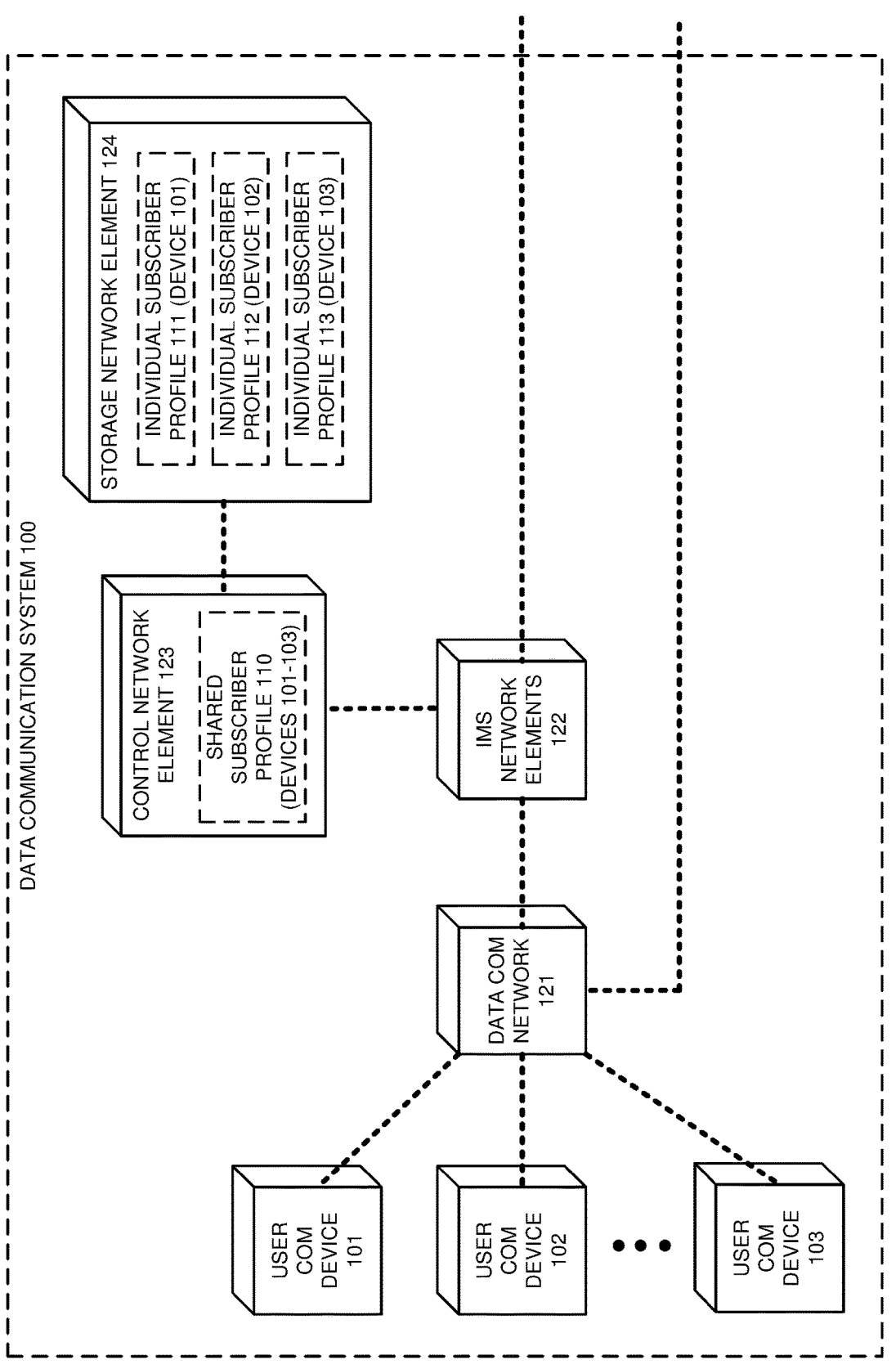
FIG. 1 illustrates an exemplary data communication system to serve an Internet Protocol Multimedia Subsystem (IMS) service to user communication devices based on individual subscriber profiles and a shared subscriber profile.

FIG. 1 illustrates exemplary data communication system 100 to serve an Internet Protocol Multimedia Subsystem (IMS) service to user communication devices 101-103 based on shared subscriber profile 110 and individual subscriber profiles 111-113. Wireless communication system 100 comprises user communication (COM) devices 101-103, data communication network 121, IMS network elements 122, control network element 123, and storage network element 124. Data communication system 100 serves IMS services to user devices 101-103 like voice calling, video calling, data messaging, or some other data communication product.

User communication devices 101-103 communicate with IMS network elements 122 over data communication network 121. Under the control of IMS network elements 122, user communication devices 101-103 communicate with external systems (not shown). Control network element 123 stores shared subscriber profile 110 for user communication devices 101-103. Storage network element 124 stores individual subscriber profile 111 for user communication device 111. Storage network element 124 stores individual subscriber profile 112 for user communication device 112. Storage network element 124 stores individual subscriber profile 113 for user communication device 113. Subscriber profiles 110-113 specify IMS characteristics for element selection, slice selection, authentication and authorization, filter criteria, multimedia telephony, and/or some other IMS service parameters. Individual subscriber profiles 111-113 indicate individual IMS characteristics that are specific to respective individual user communication devices 101-103. Shared subscriber profile 110 indicates shared IMS characteristics that are shared by user communication devices 101-103. Note that storage network element 124 which stores individual subscriber profiles 111-113 is a different network element from control network element 123 which stores shared subscriber profile 110.

To serve user communication device 101, IMS network elements 122 obtain individual subscriber profile 111 from storage network element 124 over control network element 123. IMS network elements 122 serve the IMS service to user communication device 101 based on individual subscriber profile 111. Control network element 123 determines when individual subscriber profile 111 is unavailable for user communication device 101. Individual subscriber profile 111 may be unavailable due to a problem with storage network element 124 like a fault, data corruption, overload, link failure, or some other cause. In response to the unavailability of individual subscriber profile 111, control network element 123 transfers shared subscriber profile 110 to IMS network elements 122. IMS network elements 122 then serve the IMS service to user communication device 101 based on shared subscriber profile 110.

To serve user communication device 102, IMS network elements 122 obtain individual subscriber profile 112 from storage network element 124 over control network element 123. IMS network elements 122 serve the IMS service to user communication device 102 based on individual subscriber profile 112. Control network element 123 determines when individual subscriber profile 112 is unavailable for user communication device 102. Individual subscriber profile 112 may be unavailable due to a problem with storage network element 124 like a fault, data corruption, overload, link failure, or some other cause. In response to the unavailability of individual subscriber profile 112, control network element 123 transfers shared subscriber profile 110 to IMS network elements 122. IMS network elements 122 then serve the IMS service to user communication device 102 based on shared subscriber profile 110.

To serve user communication device 103, IMS network elements 122 obtain individual subscriber profile 113 from storage network element 124 over control network element 123. IMS network elements 122 serve the IMS service to user communication device 103 based on individual subscriber profile 113. Control network element 123 determines when individual subscriber profile 112 is unavailable for user communication device 103. Individual subscriber profile 113 may be unavailable due to a problem with storage network element 124 like a fault, data corruption, overload, link failure, or some other cause. In response to the unavailability of individual subscriber profile 113, control network element 123 transfers shared subscriber profile 110 to IMS network elements 122. IMS network elements 122 then serve the IMS service to user communication device 103 based on shared subscriber profile 110.

In subscriber profiles 110-113, IMS default mandatory capabilities indicate a number, code, or some other data that is used to select IMS network elements. For example, an Interrogating Call State Control Function (I-CSCF) may use the IMS default mandatory capabilities to select a Serving Call State Control Function (S-CSCF). In subscriber profiles 110-113, IMS slice information indicates a slice identifier, slice type, or some other data that is used to select IMS slices. For example, an S-CSCF may use the IMS slice information to select a voice calling slice. In subscriber profiles 110-113, IMS authentication information indicates authentication methods like Fifth Generation Authentication and Key Management (5G-AKA), authentication bypass, or some other authentication technique. In subscriber profiles 110-113, IMS filter criteria indicates rules for user registration, voice calling, video calling, Internet Protocol (IP) messaging, Rich Communication Services (RCS), or some other service instructions. In subscriber profiles 110-113, Multimedia Telephony (MM-TEL) information indicates user communication services, session qualities, codec selection, transport optimization, interworking, or some other data communication parameters and values.

User communication devices 101-103 comprise phones, computers, vehicles, sensors, or some other data communication apparatus. Data communication network 121 comprises a wireless network, Internet-Protocol (IP) network, optical network, or some other communication equipment—including combinations thereof. IMS network element 122 comprises a Call State Control Function (CSCF), Application Server (AS), or some other IMS apparatus. Control network element 123 comprises a Home Subscriber Server (HSS), Unified Data Management (UDM), or some other communication controller. Data storage network element 124 comprises a Uniform Data Repository (UDR), Unstructured Data Storage Function (UDSF), or some other data memory.

User communication devices 101-103, data communication network 121, and network elements 122-124 comprise microprocessors, software, memories, transceivers, bus circuitry, and/or some other data processing components. The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems, utilities, protocols, applications, and functions. The microprocessors retrieve the software from the memories and execute the software to drive the operation of data communication system 100 as described herein.

FIG. 2 illustrates an exemplary operation of data communication system 100 to serve the IMS service to user communication devices 101-103 based on shared subscriber profile 110 and individual subscriber profiles 111-113. Storage network element 124 stores individual subscriber profile 111 for user communication device 101 (201). Storage network element 124 stores individual subscriber profile 112 for user communication device 102 (201). Storage network element 124 stores individual subscriber profile 113 for user communication device 103 (201). Control network element 123 stores shared subscriber profile 110 for user communication devices 101-103 (202). Control network element 123 determines when at least one of individual subscriber profiles 111-113 is unavailable from data storage network element 124 (203). Individual subscriber profiles 111-113 may be unavailable due to a problem with storage network element 124 like a fault, data corruption, overload, link failure, or some other cause.

When individual subscriber profile 111 is available from data storage network element 124 (203), IMS network elements 122 and control network element 123 serve user communication device 101 based on individual subscriber profile 111 (204). When individual subscriber profile 111 is unavailable from data storage network element 124 (203), IMS network elements 122 and control network element 123 serve user communication device 101 based on shared subscriber profile 110 (205). The operation for user communication device 101 repeats (203-205).

When individual subscriber profile 112 is available from data storage network element 124 (203), IMS network elements 122 and control network element 123 serve user communication device 102 based on individual subscriber profile 112 (206). When individual subscriber profile 112 is unavailable from data storage network element 124 (203), IMS network elements 122 and control network element 123 serve user communication device 102 based on shared subscriber profile 110 (207). The operation for user communication device 102 repeats (203, 206-207).

When individual subscriber profile 113 is available from data storage network element 124 (203), IMS network elements 122 and control network element 123 serve user communication device 103 based on individual subscriber profile 113 (208). When individual subscriber profile 113 is unavailable from data storage network element 124 (203), IMS network elements 122 and control network element 123 serve user communication device 103 based on shared subscriber profile 110 (209). The operation for user communication device 103 repeats (203, 208-209).

Figure 3:
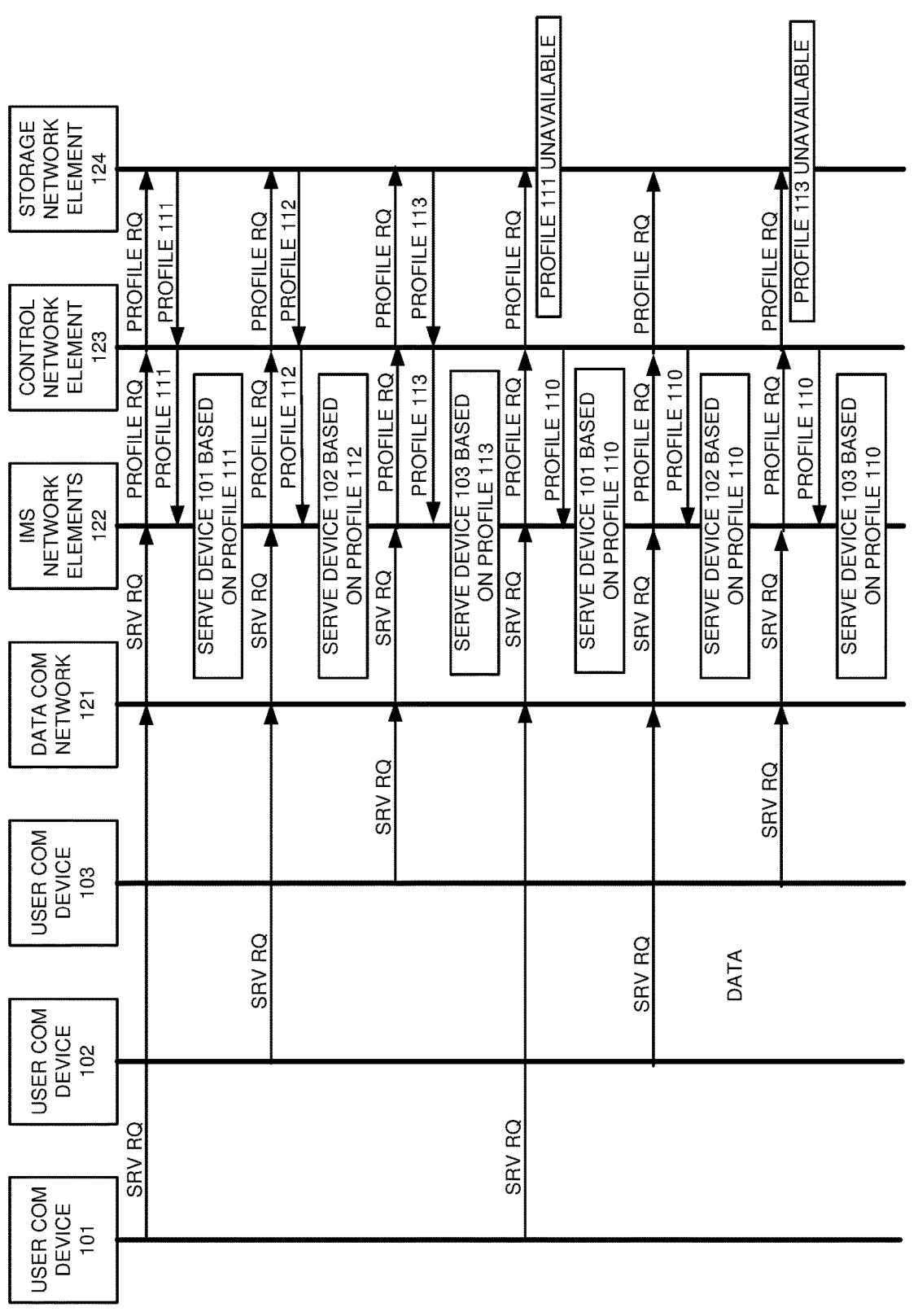
FIG. 3 illustrates an exemplary operation of the data communication system to serve the IMS service to the user communication devices based on the individual subscriber profiles and the shared subscriber profile.

FIG. 3 illustrates an exemplary operation of data communication system 100 to serve the IMS service to user communication devices 101-103 based on shared subscriber profile 110 and individual subscriber profiles 111-113. Prior to the operation depicted on FIG. 3, control network element 123 stores shared subscriber profile 110, and storage network element 124 stores individual subscriber profiles 111-113. Subscriber profiles 110-113 specify IMS characteristics for element selection, slice selection, authentication and authorization, filter criteria, multimedia telephony, and/or some other IMS communication parameters.

User communication device 101 transfers a service request (SRV RQ) to IMS network elements 122 over data communication network 121. The service request could be a registration, invite, data message, or some other service information. IMS network elements 122 transfer a profile request (RQ) for user communication device 101 to control network element 123. Control network element 123 transfers the profile request for user communication device 101 to storage network element 124, and in response, storage network element 124 transfers individual subscriber profile 111 for user communication device 101 to control network element 123. Control network element 123 transfers individual subscriber profile 111 for user communication device 101 to IMS network elements 122. IMS network elements 122 serve user communication device 101 based on individual subscriber profile 111. The service delivery may comprise registration, session set-up, message delivery, or some other IMS product.

User communication device 102 transfers a service request to IMS network elements 122 over data communication network 121. The service request could be a registration, invite, data message, or some other service information. IMS network elements 122 transfers a profile request for user communication device 102 to control network element 123. Control network element 123 transfers the profile request for user communication device 102 to storage network element 124, and in response, storage network element 124 transfers individual subscriber profile 112 for user communication device 102 to control network element 123. Control network element 123 transfers individual subscriber profile 112 for user communication device 102 to IMS network elements 122. IMS network elements 122 serve user communication device 102 based on individual subscriber profile 112. The service delivery may comprise registration, session set-up, message delivery, or some other IMS product.

User communication device 103 transfers a service request to IMS network elements 122 over data communication network 121. The service request could be a registration, invite, data message, or some other service information. IMS network elements 122 transfer a profile request for user communication device 103 to control network element 123. Control network element 123 transfers the profile request for user communication device 103 to storage network element 124, and in response, storage network element 124 transfers individual subscriber profile 113 for user communication device 103 to control network element 123. Control network element 123 transfers individual subscriber profile 113 for user communication device 103 to IMS network elements 122. IMS network elements 122 serve user communication device 103 based on individual subscriber profile 113. The service delivery may comprise registration, session set-up, message delivery, or some other IMS product.

Subsequently, user communication device 101 transfers another service request to IMS network elements 122 over data communication network 121. The service request could be a registration, invite, data message, or some other service information. IMS network elements 122 transfer a profile request for user communication device 101 to control network element 123. Control network element 123 transfers the profile request for user communication device 101 to storage network element 124, but storage network element 124 does not respond due to an overload, fault, or some other condition. In response to the failure of storage network element 124, control network element 123 transfers shared subscriber profile 110 to IMS network elements 122. IMS network elements 122 serve user communication device 101 based on shared subscriber profile 110. The service delivery may comprise registration, session set-up, message delivery, or some other IMS product.

Subsequently, user communication device 102 transfers another service request to IMS network elements 122 over data communication network 121. The service request could be a registration, invite, data message, or some other service information. IMS network elements 122 transfer a profile request for user communication device 102 to control network element 123. Control network element 123 transfers the profile request for user communication device 102 to storage network element 124, but storage network element 124 does not respond due to an overload, fault, or some other condition. In response to the failure of storage network element 124, control network element 123 transfers shared subscriber profile 110 to IMS network elements 122. IMS network elements 122 serve user communication device 102 based on shared subscriber profile 110. The service delivery may comprise registration, session set-up, message delivery, or some other IMS product.

Subsequently, user communication device 103 transfers another service request to IMS network elements 122 over data communication network 121. The service request could be a registration, invite, data message, or some other service information. IMS network elements 122 transfer a profile request for user communication device 103 to control network element 123. Control network element 123 transfers the profile request for user communication device 103 to storage network element 124, but storage network element 124 does not respond due to an overload, fault, or some other condition. In response to the failure of storage network element 124, control network element 123 transfers shared subscriber profile 110 to IMS network elements 122. IMS network elements 122 serve user communication device 103 based on shared subscriber profile 110. The service delivery may comprise registration, session set-up, message delivery, or some other IMS product.

Advantageously, data communication system 100 does not deny IMS services to user communication devices 101-103 when storage network element 124 becomes overloaded or otherwise fails. Moreover, data communication system 100 helps IMS network elements 122 to quickly recover from problems caused by the unavailability of storage network element 124.

Figure 4:
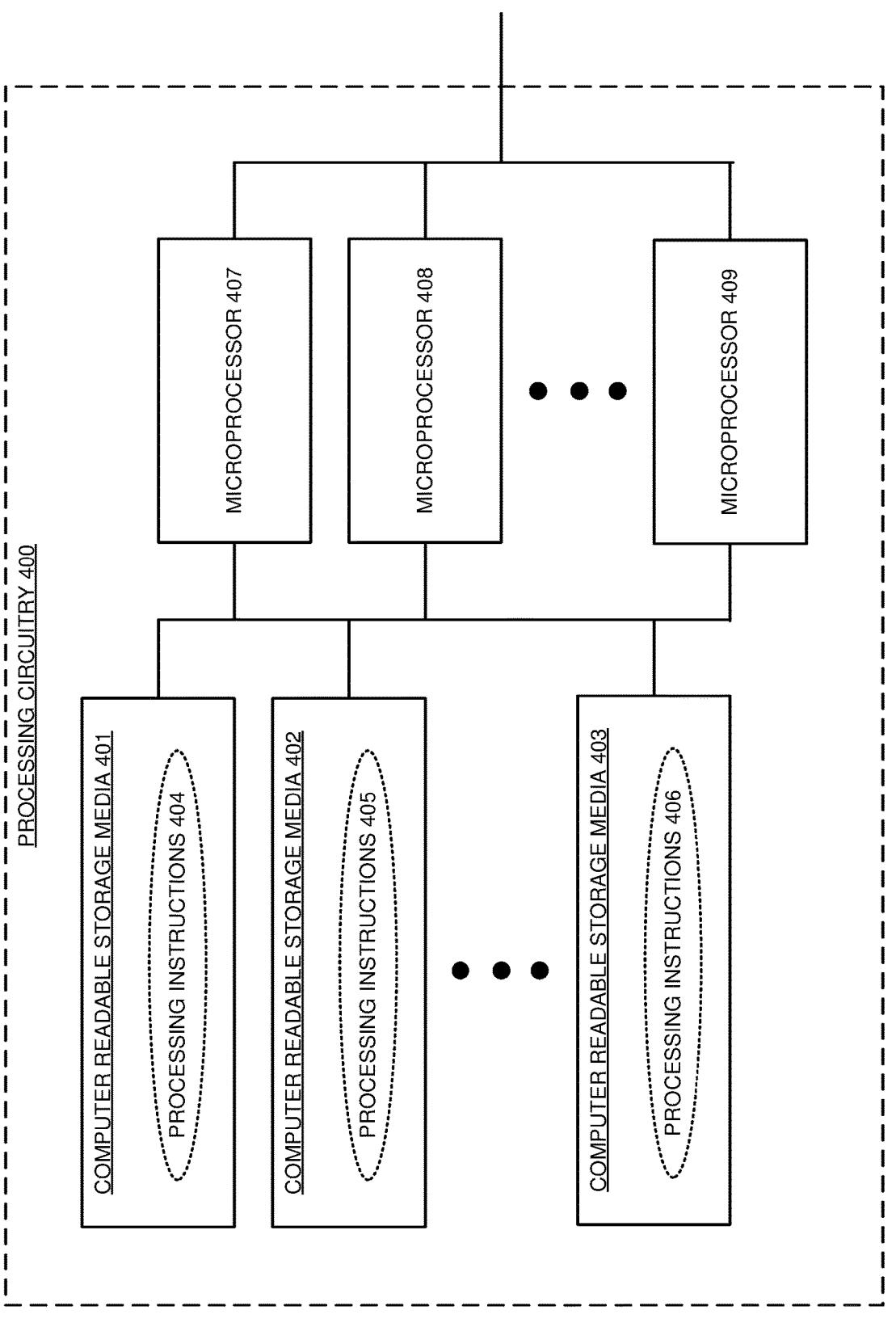
FIG. 4 illustrates exemplary processing circuitry to serve an IMS service to user communication devices based on individual subscriber profiles and a shared subscriber profile.

FIG. 4 illustrates exemplary processing circuitry 400 to serve an IMS service to user communication devices based on individual subscriber profiles and a shared subscriber profile. Processing circuitry 400 comprises an example of network elements 122-124, although network elements 122-124 may differ. Processing circuitry 400 comprises computer readable storage media 401-403 and microprocessors 407-409 that are communicatively coupled. Computer readable storage media 401-403 store processing instructions 404-406 in a non-transitory manner. Microprocessors 407-409 comprise DSPs, CPUs, GPUs, ASICs, and/or some other data processing hardware. Computer readable storage media 401-403 comprises RAM, flash circuitry, disk drives, and/or some other type of data storage apparatus. Microprocessors 407-409 retrieve processing instructions 404-406 from non-transitory computer readable storage media 401-403. Microprocessors 407-409 execute processing instructions 404-406 to serve user communication devices based on individual subscriber profiles and a shared subscriber profile as described above for data communication system 100 and as described below for wireless communication network 500. The amount of storage media, microprocessors, processing instructions that are shown in FIG. 4 is exemplary and may vary in other examples.

Figure 5:
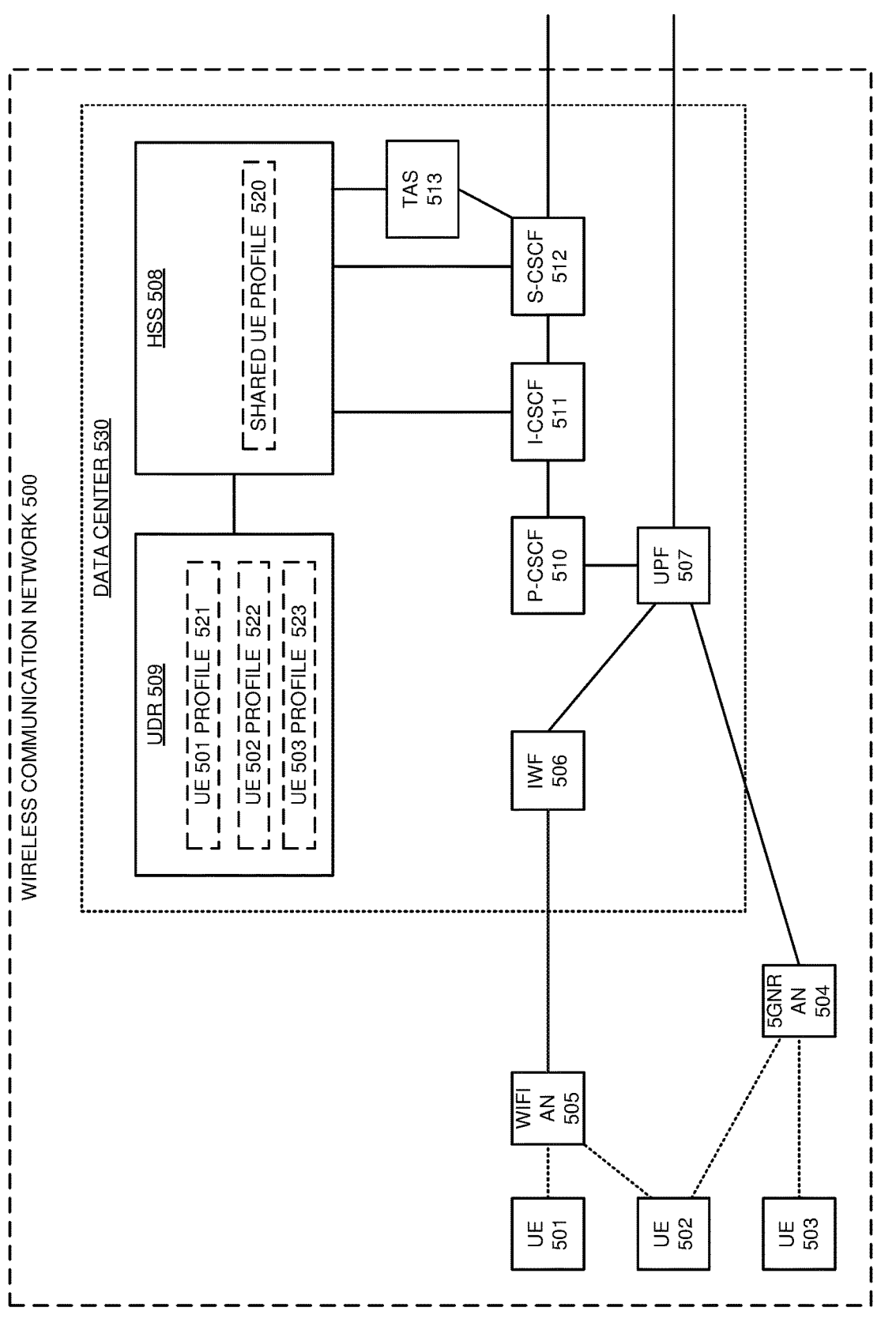
FIG. 5 illustrates an exemplary wireless communication network to serve an IMS service to User Equipment (UEs) based on individual subscriber profiles and a shared subscriber profile.

FIG. 5 illustrates exemplary wireless communication network 500 to serve IMS services to User Equipment (UEs) 501-503 based on shared UE profile 520 and individual subscriber profiles 521-523. Wireless communication network 500 comprises an example of data communication system 100, although system 100 may differ. Wireless communication network 500 comprises UEs 501-503, Fifth Generation New Radio Access Node (5GNR AN) 504, WIFI AN 505, and data center 530. Data center 530 comprises Non-Third Generation Partnership Project Interworking Function (IWF) 506, User Plane Function (UPF) 507, Home Subscriber Server (HSS) 508, Unified Data Repository (UDR) 509, Proxy Call State Control Function (P-CSCF) 510, Interrogating CSCF (I-CSCF) 511, Serving CSCF (S-CSCF) 512, and Telephony Application Server (TAS) 513.

HSS 508 stores shared UE profile 520 which can be lightweight (<10 kilobytes). UDR 509 stores UE 501 profile 521, UE 502 profile 522, and UE 503 profile 523. Updates to shared UE profile 520 are stored in UDR 509. HSS 508 periodically retrieves and caches a current version of shared UE profile 520 from UDR 509. For example, HSS 508 may have a configurable timer that triggers the retrieval of shared UE profile 520 from UDR 509. Profiles 520-523 specify IMS characteristics for element selection, slice selection, authentication and authorization, filter criteria, multimedia telephony, and/or some other IMS service parameters. Profiles 521-523 indicate individual IMS characteristics that are specific to respective individual UEs 501-503. Shared UE profile 520 indicates shared IMS characteristics that are shared by UEs 501-503.

In profiles 520-523, IMS default mandatory capabilities indicate a number, code, or some other data that is used to select IMS network elements. For example, I-CSCF 511 may use the IMS default mandatory capabilities to select S-CSCF 512 (from among other S-CSCFs which are omitted for clarity). In profiles 520-523, IMS slice information indicates a slice identifier, slice type, or some other data that is used to select IMS slices. For example, S-CSCF 512 may use the IMS slice information to select a voice calling slice that includes TAS 513. In profiles 520-523, IMS authentication information indicates authentication methods like Fifth Generation Authentication and Key Management (5G-AKA), authentication bypass, or some other authentication technique. For example, S-CSCF 512 may bypass authentication for UEs that were previously authenticated. In subscriber profiles 520-523, IMS filter criteria indicates rules for user registration, voice calling, video calling, Internet Protocol (IP) messaging, Rich Communication Services (RCS), or some other service instructions. In profiles 520-523, Multimedia Telephony (MM-TEL) information indicates user communication services, session qualities, codec selection, transport optimization, interworking, or some other data communication parameters and values.

In operation, UE 501 transfers an IMS registration to I-CSCF 511 over WIFI AN 505, IWF 506, UPF 507, and P-CSCF 510. I-CSCF 511 requests user authentication information for UE 501 from HSS 508. HSS 508 requests user authentication information for UE 501 from UDR 509. UDR 509 transfers individual default mandatory capabilities for UE 501 from UE 501 profile 511 to HSS 508. HSS 508 transfers the individual default mandatory capabilities for UE 501 from UE 501 profile 511 to I-CSCF 511. I-CSCF 511 selects S-CSCF 512 for UE 501 based on the individual default mandatory capabilities for UE 501 from UE 501 profile 511. I-CSCF 511 transfers the IMS registration to selected S-CSCF 512.

S-CSCF 512 transfers a Multimedia Authorization Request (MAR) for UE 501 to HSS 508. HSS 508 requests user authentication information for UE 501 from UDR 509. UDR 509 transfers an individual user authentication vector for UE 501 from UE 501 profile 511 to HSS 508. HSS 508 transfers a Multimedia Authorization Answer (MAA) that has the individual authentication vector for UE 501 to S-CSCF 512. S-CSCF 512 exchanges authentication data with UE 501 and authorizes UE 501 based on the authentication vector and the authentication data for UE 501.

After authentication, S-CSCF 512 transfers a Server Assignment Request (SAR) for UE 501 to HSS 508. HSS 508 requests user service information including individual filter criteria and slice information for UE 501 from UDR 509. UDR 509 transfers UE 501 profile 521 that includes the individual filter criteria and individual slice information for UE 501 to HSS 508. HSS 508 transfers a Server Assignment Answer (SAA) that has UE 501 profile 521 to S-CSCF 512. S-CSCF 512 selects a voice calling slice for UE 501 based on the individual slice type for UE 501 in UE 501 profile 521. S-CSCF 512 applies the individual filter criteria to select TAS 513 in the selected voice calling slice for UE 501. S-CSCF 512 may initiate other tasks that are triggered by the individual filter criteria. S-CSCF 512 transfers a registration OK message to UE 501.

To initiate a voice call over the voice calling slice, UE 501 transfers a Session Initiation Protocol (SIP) INVITE message indicating the called party to TAS 513 over WIFI AN 505, IWF 506, UPF 507, and CSCFs 510-512. TAS 513 transfers multimedia telephony information request for UE 501 to HSS 508. HSS 508 requests multimedia telephony information for UE 501 from UDR 509. UDR 509 transfers individual MM-TEL data from UE 501 profile 521 to HSS 508. HSS 508 transfers the individual MM-TEL data for UE 501 to TAS 513. TAS 513 processes the individual MM-TEL data for UE 501 to process the INVITE and interact with the call destination (not shown). TAS 513 exchanges SIP messages with UE 501 and the call destination to exchange IP addresses and perform other call functions. UE 501 and the called destination then exchange IP voice packets over WIFI AN 505, IWF 506, UPF 507.

Subsequently, UE 501 transfers another IMS registration to I-CSCF 511 over WIFI AN 505, IWF 506, UPF 507, and P-CSCF 510. I-CSCF 511 requests user authentication information for UE 501 from HSS 508. HSS 508 requests user authentication information for UE 501 from UDR 509. UDR 509 does not respond to HSS 508 due to an overload, fault, or some other cause. In response to the failure of UDR 509, HSS 508 transfers shared default mandatory capabilities from shared UE profile 520 to I-CSCF 511. I-CSCF 511 selects S-CSCF 512 for UE 501 based on the shared default mandatory capabilities from shared UE profile 520. I-CSCF 510 transfers the IMS registration to selected S-CSCF 512. S-CSCF 512 transfers a MAR for UE 501 to HSS 508. HSS 508 requests user authentication information for UE 501 from UDR 509. UDR 509 does not respond to HSS 508 due to an overload, fault, or some other cause. In response to the failure of UDR 509, HSS 508 transfers an MAA that has an authentication bypass for UE 501 from shared UE profile 520 to S-CSCF 512. S-CSCF 512 bypasses authentication for UE 501 and authorizes UE 501 for services as indicated by shared UE profile 520.

After authentication, S-CSCF 512 transfers a SAR for UE 501 to HSS 508. HSS 508 requests user service information including filter criteria and slice information for UE 501 from UDR 509. UDR 509 does not respond to HSS 508 due to an overload, fault, or some other cause. In response to the failure of UDR 509, HSS 508 transfers an SAA that has shared filter criteria and shared slice information from shared UE profile 520 to S-CSCF 512. S-CSCF 512 selects a voice calling slice for UE 501 based on the shared slice information. S-CSCF 512 applies the shared filter criteria to select TAS 513 in the selected voice calling slice for UE 501. S-CSCF 512 may initiate other tasks that are triggered by the shared filter criteria. S-CSCF 512 transfers a registration OK message to UE 501.

To initiate a voice call over the voice calling slice, UE 501 transfers a SIP INVITE message indicating the called party to TAS 513 over WIFI AN 505, IWF 506, UPF 507, and CSCFs 510-512. TAS 513 transfers a multimedia telephony information request for UE 501 to HSS 508. HSS 508 requests multimedia telephony information for UE 501 from UDR 509. UDR 509 does not respond to HSS 508 due to an overload, fault, or some other cause. In response to the failure of UDR 509, HSS 508 transfers shared MM-TEL data from shared UE profile 520 to TAS 513. TAS 513 processes the shared MM-TEL data to process the INVITE for UE 501 and interact with the call destination (not shown). TAS 513 exchanges SIP messages with UE 501 and the call destination to exchange IP addresses and perform other call functions. UE 501 and the called destination then exchange IP voice packets over WIFI AN 505, IWF 506, and UPF 507.

UE 503 transfers an IMS registration to I-CSCF 511 over 5GNR AN 504, UPF 507, and P-CSCF 510. I-CSCF 511 requests user authentication information for UE 503 from HSS 508. HSS 508 requests user authentication information for UE 503 from UDR 509. UDR 509 transfers individual default mandatory capabilities for UE 503 from UE 503 profile 513 to HSS 508. HSS 508 transfers the individual default mandatory capabilities for UE 503 from UE 503 profile 513 to I-CSCF 511. I-CSCF 511 selects S-CSCF 512 for UE 503 based on the individual default mandatory capabilities for UE 503 from UE 503 profile 511. I-CSCF 511 transfers the IMS registration to S-CSCF 512.

S-CSCF 512 transfers a MAR for UE 503 to HSS 508. HSS 508 requests user authentication information for UE 503 from UDR 509. UDR 509 transfers an individual user authentication vector for UE 503 from UE 503 profile 513 to HSS 508. HSS 508 transfers an MAA that has the individual authentication vector for UE 503 to S-CSCF 512. S-CSCF 512 exchanges authentication data with UE 503 and authorizes UE 503 based on the authentication vector and the authentication data for UE 503.

After authentication, S-CSCF 512 transfers a SAR for UE 503 to HSS 508. HSS 508 requests user service information including individual filter criteria and slice information for UE 503 from UDR 509. UDR 509 transfers UE 503 profile 523 that includes the individual filter criteria and individual slice information for UE 503 to HSS 508. HSS 508 transfers an SAA that has UE 503 profile 523 to S-CSCF 512. S-CSCF 512 selects a voice calling slice for UE 503 based on the individual slice type for UE 503. S-CSCF 512 applies the individual filter criteria to select TAS 513 in the selected voice calling slice for UE 503. S-CSCF 512 may initiate other tasks that are triggered by the individual filter criteria. S-CSCF 512 transfers a registration OK message to UE 503.

To initiate a voice call over the voice calling slice, UE 503 transfers a SIP INVITE message indicating the called party to TAS 513 over 5GNR AN 504, UPF 507, and CSCFs 510-512. TAS 513 transfers a multimedia telephony information request for UE 503 to HSS 508. HSS 508 requests multimedia telephony information for UE 503 from UDR 509. UDR 509 transfers individual MM-TEL data from UE 503 profile 523 to HSS 508. HSS 508 transfers the individual MM-TEL data for UE 503 to TAS 513. TAS 513 processes the individual MM-TEL data for UE 503 to process the INVITE and interact with the call destination (not shown). TAS 513 exchanges SIP messages with UE 503 and the call destination to exchange IP addresses and perform other call functions. UE 503 and the called destination then exchange IP voice packets over 5GNR AN 504 and UPF 507.

Subsequently, UE 503 transfers another IMS registration to I-CSCF 511 over 5GNR AN 504, UPF 507, and P-CSCF 510. I-CSCF 511 requests user authentication information for UE 503 from HSS 508. HSS 508 requests user authentication information for UE 503 from UDR 509. UDR 509 does not respond to HSS 508 due to an overload, fault, or some other cause. In response to the failure of UDR 509, HSS 508 transfers shared default mandatory capabilities from shared UE profile 520 to I-CSCF 511. I-CSCF 511 selects S-CSCF 512 for UE 503 based on the shared default mandatory capabilities from shared UE profile 520. I-CSCF 510 transfers the IMS registration to S-CSCF 512. S-CSCF 512 transfers a MAR for UE 503 to HSS 508. HSS 508 requests user authentication information for UE 503 to UDR 509. UDR 509 does not respond to HSS 508 due to an overload, fault, or some other cause. In response to the failure of UDR 509, HSS 508 transfers an MAA that has an authentication bypass for UE 503 from shared UE profile 520 to S-CSCF 512. S-CSCF 512 bypasses authentication for UE 503 and authorizes UE 503 for services as indicated by shared UE profile 520.

After authentication, S-CSCF 512 transfers a SAR for UE 503 to HSS 508. HSS 508 requests user service information including filter criteria and slice information for UE 503 from UDR 509. UDR 509 does not respond to HSS 508 due to an overload, fault, or some other cause. In response to the failure of UDR 509, HSS 508 transfers an SAA that has shared filter criteria and shared slice information from shared UE profile 520 to S-CSCF 512. S-CSCF 512 selects a voice calling slice for UE 503 based on the shared slice information. S-CSCF 512 applies the shared filter criteria to select TAS 513 in the selected voice calling slice for UE 503. S-CSCF 512 may initiate other tasks that are triggered by the shared filter criteria. S-CSCF 512 transfers a registration OK message to UE 503.

To initiate a voice call over the voice calling slice, UE 503 transfers a SIP INVITE message indicating the called party to TAS 513 over 5GNR AN 504, UPF 507, and CSCFs 510-512. TAS 513 transfers a multimedia telephony information request for UE 503 to HSS 508. HSS 508 requests multimedia telephony information for UE 503 from UDR 509. UDR 509 does not respond to HSS 508 due to an overload, fault, or some other cause. In response to the failure of UDR 509, HSS 508 transfers shared MM-TEL data from shared UE profile 520 to TAS 513. TAS 513 processes the shared MM-TEL data to process the INVITE for UE 503 and interact with the call destination (not shown). TAS 513 exchanges SIP messages with UE 503 and the call destination to exchange IP addresses and perform other call functions. UE 503 and the called destination then exchange IP voice packets over 5GNR AN 504 and UPF 507.

UE 502 operates over WIFI AN 505 and IWF 506 as described above for UE 501. UE 502 operates over 5GNR AN 504 as described above for UE 503. When UDR 509 is operating properly, wireless communication network 500 serves UE 502 based on the individual parameters in UE 502 profile 522. For example, S-CSCF 512 would use individual filter criteria from UE 502 profile 522 to serve UE 502. When UDR 509 is not operating properly, wireless communication network 500 serves UE 502 based on the shared parameters in shared UE profile 520. For example, S-CSCF 512 would use shared filter criteria from shared profile 520 to serve UE 502.

Figure 6:
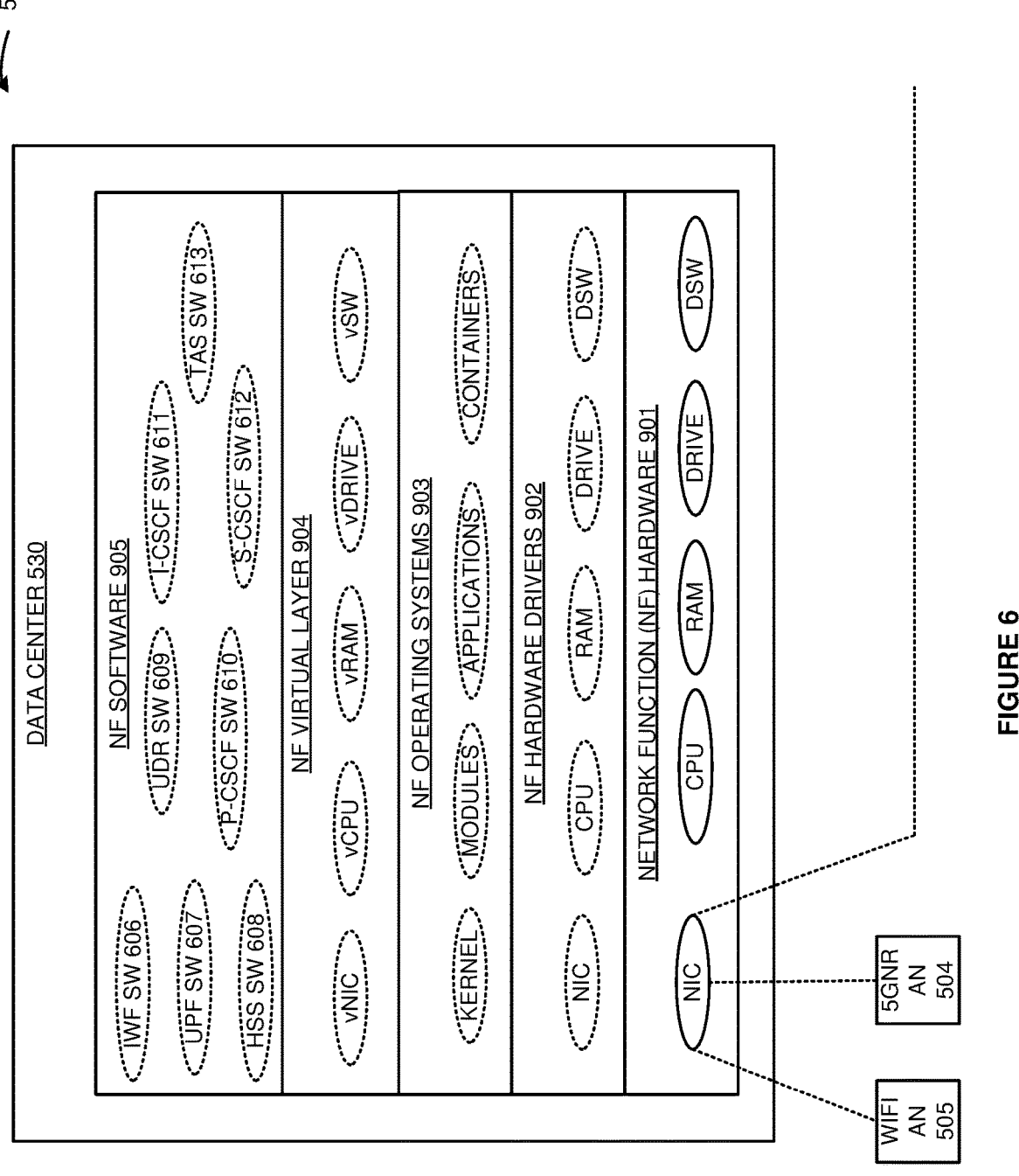
FIG. 6 illustrates an exemplary data center in the wireless communication network to serve the IMS service to the UEs based on the individual subscriber profiles and the shared subscriber profile.

FIG. 6 illustrates exemplary data center 530 in wireless communication network 500 to serve the IMS services to UEs 501-503 based on shared UE profile 520 and individual subscriber profiles 521-523. Data center 530 comprises an example of network elements 122-124 and circuitry 400, although elements 122-124 and circuitry 400 may differ. Data center 530 comprises NF hardware 601, NF hardware drivers 602, NF operating systems 603, NF virtual layer 604, and NF Software (SW) 605. NF hardware 601 comprises Network Interface Cards (NICs), CPU, RAM, Flash/Disk Drives (DRIVE), and Data Switches (DSW). NF hardware drivers 602 comprise software that is resident in the NIC, CPU, RAM, DRIVE, and DSW. NF operating systems 603 comprise kernels, modules, applications, and containers. NF virtual layer 604 comprises vNIC, vCPU, vRAM, vDRIVE, and vSW. NF SW 605 comprises IWF SW 606, UPF SW 607, HSS SW 608, UDR SW 609, P-CSCF SW 610, I-CSCF SW 611, S-CSCF SW 612, and TAS SW 613. The NIC in NF hardware 601 are coupled to 5GNR AN 504, WIFI AN 505, and external systems. NF hardware 601 executes NF hardware drivers 602, NF operating systems 603, NF virtual layer 604, and NF SW 605 to form and operate IWF 506, UPF 507, HSS 508, UDR 509, P-CSCF 510, I-CSCF 511, S-CSCF 512, and TAS 513 as described herein. Thus, data center 530 comprises one or more microprocessors and one or more non-transitory computer readable storage media that store processing instructions that direct data center 530 to perform the methods described herein. Network data center 530 may be located at a single site or be distributed across multiple geographic locations.

Figure 7:
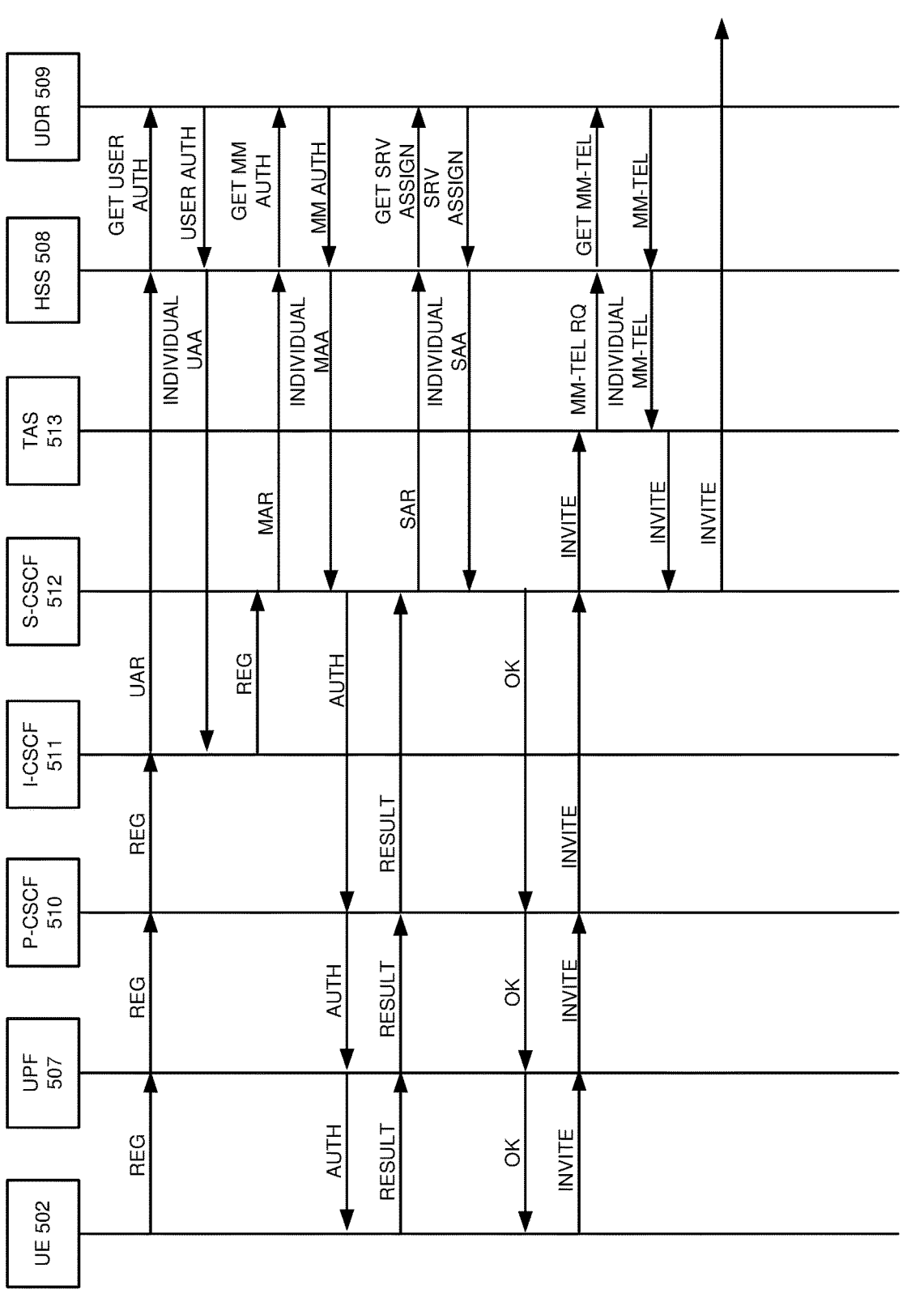
FIG. 7 illustrates an exemplary operation of the wireless communication network to serve the IMS service to the UEs based on the individual subscriber profiles.

FIG. 7 illustrates an exemplary operation of wireless communication network 500 to serve the IMS service to UE 502 based on individual UE 502 subscriber profile 522. The operation may vary in other examples. UE 502 and UPF 507 communicate over a path that comprises 5GNR AN 504 or a path that comprises WIFI AN 505-IWF 506. For clarity, these paths are omitted from FIG. 7. UE 502 transfers an IMS registration (REG) to I-CSCF 511 over UPF 507. P-CSCF 510 handles IMS access tasks and transfers the IMS registration to I-CSCF 511.

I-CSCF 511 transfers a UAR for UE 502 to HSS 508. HSS 508 requests user authentication information for UE 502 from UDR 509. UDR 509 transfers individual user authentication information for UE 502 to HSS 508 like default mandatory capabilities from individual UE 502 profile 522. HSS 508 transfers an individual MAA to I-CSCF 511 with the individual authentication information like the default mandatory capabilities for UE 502. I-CSCF 511 selects S-CSCF 512 for UE 502 based on the individual default mandatory capabilities for UE 502 from UE 502 profile 522. I-CSCF 511 transfers the IMS registration to S-CSCF 512.

S-CSCF 512 transfers a MAR for UE 502 to HSS 508. HSS 508 requests multimedia (MM) authentication information for UE 502 from UDR 509. UDR 509 transfers individual multimedia authentication information to HSS 508 like an authentication vector for UE 502 from UE 502 profile 522. HSS 508 transfers an MAA to S-CSCF 512 that has the individual multimedia authentication information for UE 502. S-CSCF 512 transfers an authentication challenge (AUTH) to UE 502 over P-CSCF 510 and UPF 507. UE 502 returns an authentication result to S-CSCF 512 over UPF 507 and P-CSCF 510. S-CSCF 512 authorizes UE 502 based on the authentication vector and the authentication result for UE 502.

After authentication, S-CSCF 512 transfers a SAR for UE 502 to HSS 508. HSS 508 requests a server assignment (SRV ASSN) from UDR 509 that includes individual filter criteria and slice information for UE 502. UDR 509 transfers the server assignment to HSS 508 that has UE 502 profile 522 which includes the individual filter criteria and individual slice information for UE 502. HSS 508 transfers an SAA that has UE 502 profile 522 to S-CSCF 512. S-CSCF 512 selects a voice calling slice for UE 502 based on the individual slice type for UE 502 in UE 502 profile 522. S-CSCF 512 applies the individual filter criteria from UE 502 profile 522 to select TAS 513 which is in the selected voice calling slice for UE 502. S-CSCF 512 may initiate other tasks that are triggered by the individual filter criteria. S-CSCF 512 transfers a registration OK message to UE 502 over P-CSCF 510 and UPF 507.

To initiate a voice call over the voice calling slice, UE 502 transfers a Session Initiation Protocol (SIP) INVITE message indicating the called party to TAS 513 over UPF 507, P-CSCF 510, and S-CSCF 512. TAS 513 transfers an MM-TEL request for UE 502 to HSS 508. HSS 508 requests MM-TEL information for UE 501 from UDR 509. UDR 509 transfers individual MM-TEL data from UE 502 profile 522 to HSS 508. HSS 508 transfers the individual MM-TEL data for UE 502 to TAS 513. TAS 513 processes the individual MM-TEL data for UE 502 to process and forward the INVITE to the call destination (not shown).

Figure 8:
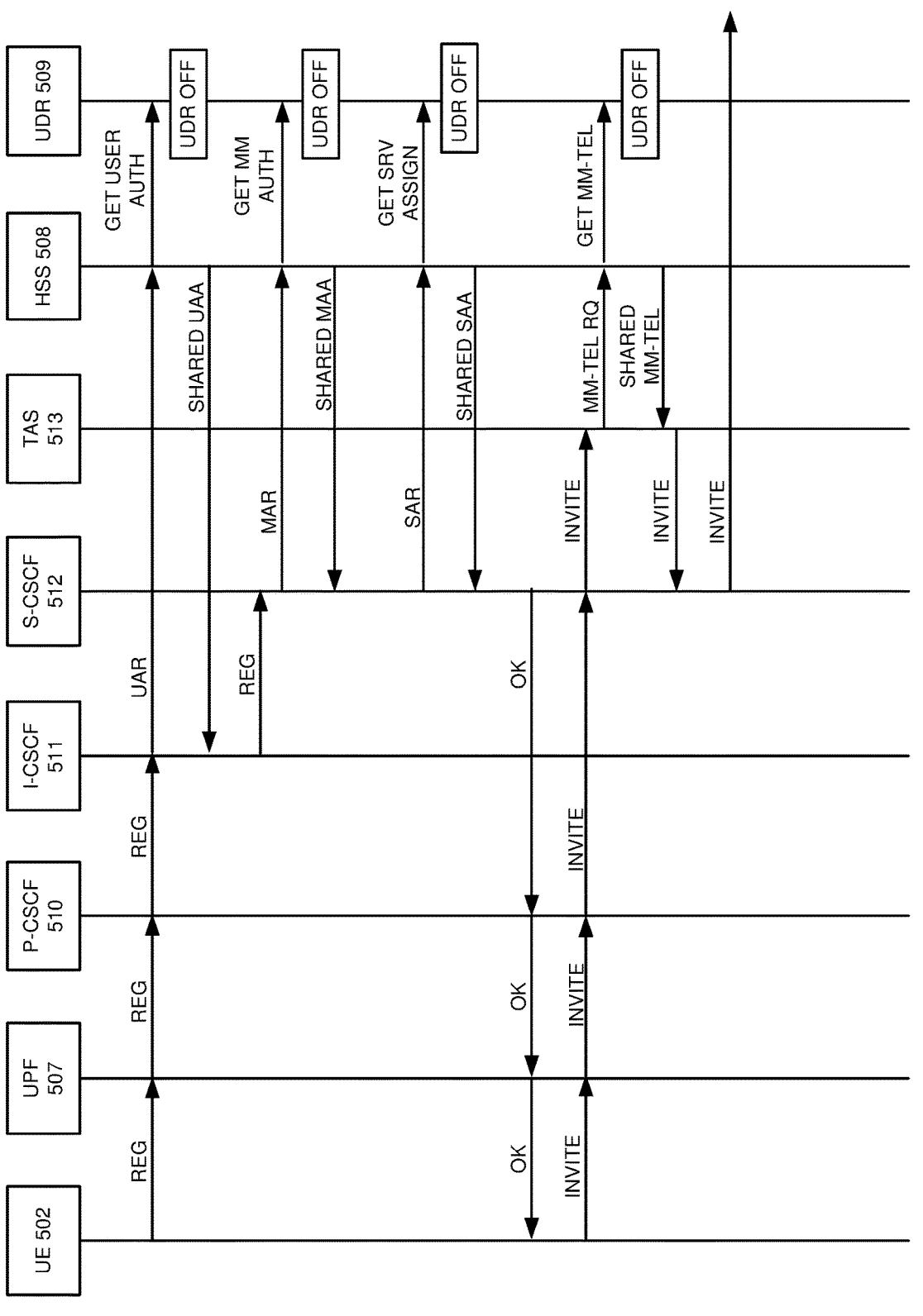
FIG. 8 illustrates an exemplary operation of the wireless communication network to serve the IMS service to the UEs based on the shared subscriber profile.

FIG. 8 illustrates an exemplary operation of wireless communication network 500 to serve the IMS service to UEs 501-503 based on shared UE profile 520. The operation may vary in other examples. UE 502 and UPF 507 communicate over a path that comprises 5GNR AN 504 or a path that comprises WIFI AN 505-IWF 506. For clarity, these paths are omitted from FIG. 8. UE 502 transfers an IMS registration (REG) to I-CSCF 511 over UPF 507. P-CSCF 510 handles IMS access tasks and transfers the IMS registration to I-CSCF 511.

I-CSCF 511 transfers a UAR for UE 502 to HSS 508. HSS 508 requests user authentication information for UE 502 from UDR 509. UDR 509 does not respond to HSS 508 due to an overload, fault, or some other cause (UDR OFF). In response to the failure of UDR 509, HSS 508 transfers a UAA to I-CSCF 511 with shared user authentication information for UE 502 like shared default mandatory capabilities from shared UE profile 520. I-CSCF 511 selects S-CSCF 512 for UE 502 based on the shared default mandatory capabilities from shared UE profile 520. I-CSCF 511 transfers the IMS registration to S-CSCF 512.

S-CSCF 512 transfers a MAR for UE 502 to HSS 508. HSS 508 requests multimedia (MM) authentication information for UE 502 from UDR 509. UDR 509 does not respond to HSS 508 due to an overload, fault, or some other cause. In response to the failure of UDR 509, HSS 508 transfers a shared MAA to S-CSCF 512 that has shared multimedia authentication information from shared UE profile 520 like an authentication bypass instruction for UE 502. S-CSCF 512 bypasses multimedia authentication for UE 502 and authorizes UE 502 based on the shared multimedia authentication information in shared UE profile 520.

After authentication, S-CSCF 512 transfers a SAR for UE 502 to HSS 508. HSS 508 requests a server assignment (SRV ASSN) from UDR 509 that includes individual filter criteria and slice information for UE 502. UDR 509 does not respond to HSS 508 due to an overload, fault, or some other cause. In response to the failure of UDR 509, HSS 508 transfers an SAA to S-CSCF 512 that has shared filter criteria and slice information for UE 502 form shared UE profile 520. S-CSCF 512 selects a voice calling slice for UE 502 based on the shared slice type. S-CSCF 512 applies the shared filter criteria to select TAS 513 in the selected voice calling slice. S-CSCF 512 may initiate other tasks that are triggered by the shared filter criteria. S-CSCF 512 transfers a registration OK message to UE 502 over P-CSCF 510 and UPF 507.

To initiate a voice call over the voice calling slice, UE 502 transfers a SIP INVITE message indicating the called party to TAS 513 over UPF 507, P-CSCF 510, and S-CSCF 512. TAS 513 transfers an MM-TEL request for UE 502 to HSS 508. HSS 508 requests MM-TEL information for UE 501 from UDR 509. UDR 509 does not respond to HSS 508 due to an overload, fault, or some other cause. In response to the failure of UDR 509, HSS 508 transfers shared MM-TEL data to TAS 513 from share UE profile 520. TAS 513 processes the shared MM-TEL data to process and forward the INVITE to the call destination (not shown).

The wireless communication system circuitry described above comprises computer hardware and software that form special-purpose data communication circuitry to serve an IMS service to user communication devices based on individual subscriber profiles and a shared subscriber profile. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose data communication circuitry to serve an IMS service to user communication devices based on individual subscriber profiles and a shared subscriber profile.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to serve an Internet Protocol Multimedia Subsystem (IMS) service to user communication devices based on individual subscriber profiles and a shared subscriber profile, the method comprising:

storing the individual subscriber profiles and storing the shared subscriber profile;

serving the IMS service to the user communication devices based on the individual subscriber profiles; and determining when one or more of the individual subscriber profiles are unavailable for one or more of the user communication devices, and in response, serving the IMS service to the one or more of the user communication devices based on the shared subscriber profile.

2. The method of claim 1 wherein:

the individual subscriber profiles indicate individual IMS default mandatory capabilities;

the shared subscriber profile indicates shared IMS default mandatory capabilities;

serving the IMS service to the user communication devices based on the individual subscriber profiles comprises serving the IMS service to the user communication devices based on the individual IMS default mandatory capabilities; and serving the IMS service to the one or more of the user communication devices based on the shared subscriber profile comprises serving the IMS service to the one or more of the user communication devices based on the shared IMS default mandatory capabilities.

3. The method of claim 1 wherein:

the individual subscriber profiles indicate individual IMS initial filter criteria;

the shared subscriber profile indicates shared IMS initial filter criteria;

serving the IMS service to the user communication devices based on the individual subscriber profiles comprises serving the IMS service to the user communication devices based on the individual IMS initial filter criteria; and serving the IMS service to the one or more of the user communication devices based on the shared subscriber profile comprises serving the IMS service to the one or more of the user communication devices based on the shared IMS initial filter criteria.

4. The method of claim 1 wherein:

the individual subscriber profiles indicate individual IMS slice information;

the shared subscriber profile indicates shared IMS slice information;

serving the IMS service to the user communication devices based on the individual subscriber profiles comprises serving the IMS service to the user communication devices based on the individual IMS slice information; and serving the IMS service to the one or more of the user communication devices based on the shared subscriber profile comprises serving the IMS service to the one or more of the user communication devices based on the shared IMS slice information.

5. The method of claim 1 wherein:

the individual subscriber profiles indicate individual IMS Multimedia Telephony (MMTEL) information;

the shared subscriber profile indicates shared IMS MMTEL information;

serving the IMS service to the user communication devices based on the individual subscriber profiles comprises serving the IMS service to the user communication devices based on the individual IMS MMTEL information; and serving the IMS service to the one or more of the user communication devices based on the shared subscriber profile comprises serving the IMS service to the one or more of the user communication devices based on the shared IMS MMTEL information.

6. The method of claim 1 wherein:

the individual subscriber profiles indicate individual IMS authentication information;

the shared subscriber profile indicates shared IMS authentication information;

serving the IMS service to the user communication devices based on the individual subscriber profiles comprises serving the IMS service to the user communication devices based on the individual IMS authentication information; and serving the IMS service to the one or more of the user communication devices based on the shared subscriber profile comprises serving the IMS service to the one or more of the user communication devices based on the shared IMS authentication information.

7. The method of claim 1 wherein:

serving the IMS service to the user communication devices based on the individual subscriber profiles comprises serving at least one of a voice calling service and a video calling service to the user communication devices based on the individual subscriber profiles; and serving the IMS service to the one or more of the user communication devices based on the shared subscriber profile comprises serving the at least one of the voice calling service and the video calling service to the one or more of the user communication devices based on the shared IMS subscriber profile.

8. A method of operating an Internet Protocol Multimedia Subsystem (IMS) to serve an IMS service to user communication devices based on individual subscriber profiles and a shared subscriber profile, the method comprising:

storing, by a Uniform Data Repository (UDR), the individual subscriber profiles;

storing, by a Home Subscriber Server (HSS), the shared subscriber profile;

serving, by the HSS and an IMS element, the IMS service to the user communication devices based on the individual subscriber profiles; and determining, by the HSS, when one or more of the individual subscriber profiles are unavailable for one or more of the user communication devices, and in response, serving, by the HHS and the IMS element, the IMS service to the one or more of the user communication devices based on the shared subscriber profile.

9. The method of claim 8 wherein:

serving, by the HHS and the IMS element, the IMS service to the user communication devices based on the individual subscriber profiles comprises serving, by the HSS and a Call State Control Function (CSCF), the IMS service to the user communication devices based on the individual subscriber profiles; and serving, by the HHS and the IMS element, the IMS service to the one or more of the user communication devices based on the shared subscriber profile comprises serving, by the HSS and the CSCE, the IMS service to the one or more of the user communication devices based on the shared subscriber profile.

10. The method of claim 8 wherein:

serving, by the HHS and the IMS element, the IMS service to the user communication devices based on the individual subscriber profiles comprises serving, by the HSS and an Interrogating Call State Control Function (I-CSCF), the IMS service to the user communication devices based on the individual subscriber profiles; and serving, by the HHS and the IMS element, the IMS service to the one or more of the user communication devices based on the shared subscriber profile comprises serving, by the HSS and the I-CSCF, the IMS service to the one or more of the user communication devices based on the shared subscriber profile.

11. The method of claim 8 wherein:

serving, by the HHS and the IMS element, the IMS service to the user communication devices based on the individual subscriber profiles comprises serving, by the HSS and a Serving Call State Control Function (S-CSCF), the IMS service to the user communication devices based on the individual subscriber profiles; and serving, by the HHS and the IMS element, the IMS service to the one or more of the user communication devices based on the shared subscriber profile comprises serving, by the HSS and the S-CSCF, the IMS service to the one or more of the user communication devices based on the shared subscriber profile.

12. The method of claim 8 wherein:

serving, by the HHS and the IMS element, the IMS service to the user communication devices based on the individual subscriber profiles comprises serving, by the HSS and a Telephony Application Server (TAS), the IMS service to the user communication devices based on the individual subscriber profiles; and the HSS and the IMS element serving the IMS service to the one or more of the user communication devices based on the shared subscriber profile comprises serving, by the HSS and the TAS, the IMS service to the one or more of the user communication devices based on the shared subscriber profile.

13. The method of claim 8 wherein:

storing, by the UDR, the individual subscriber profiles comprises storing, by the UDR, at least one of individual IMS default mandatory capabilities, individual IMS initial filter criteria, individual IMS slice information, individual IMS Multimedia Telephony (MMTEL) information, and individual IMS authentication information;

storing, by the HSS, the shared subscriber profile comprises storing, by the HSS, at least one of shared IMS default mandatory capabilities, shared IMS initial filter criteria, shared IMS slice information, shared IMS MMTEL information, and shared IMS authentication information;

serving, by the HSS and the IMS element, the IMS service to the user communication devices based on the individual subscriber profiles comprises serving, by the HSS and the IMS element, the IMS service to the user communication devices based on at least one of the individual IMS default mandatory capabilities, the individual IMS initial filter criteria, the individual IMS slice information, the individual IMS MMTEL information, and the individual IMS authentication information; and serving, by the HSS and the IMS element, the IMS service to the one or more of the user communication devices based on the shared subscriber profile comprises serving, by the HSS and the IMS element, the IMS service to the one or more of the user communication devices based on at least one of the shared IMS default mandatory capabilities, the shared IMS initial filter criteria, the shared IMS slice information, the shared IMS MMTEL information, and the shared IMS authentication information.

14. The method of claim 8 wherein:

serving, by the HSS and the IMS element, the IMS service to the user communication devices based on the individual subscriber profiles comprises serving, by the HSS and the IMS element, at least one of a voice calling service and a video calling service to the user communication devices based on the individual subscriber profiles; and serving, by the HSS and the IMS element, the IMS service to the one or more of the user communication devices based on the shared subscriber profile comprises serving, by the HSS and the IMS element, the at least one of the voice calling service and the video calling service to the user communication devices based on the shared subscriber profile.

15. An Internet Protocol Multimedia Subsystem (IMS) to serve an IMS service to user communication devices based on individual subscriber profiles and a shared subscriber profile, the IMS comprising:

a Uniform Data Repository (UDR) configured to store the individual subscriber profiles;

a Home Subscriber Server (HSS) configured to store the shared subscriber profile;

the HSS further configured to serve the IMS service to the user communication devices based on the individual subscriber profiles;

an IMS element configured to serve the IMS service to the user communication devices based on the individual subscriber profiles;

the HSS further configured to determine when one or more of the individual subscriber profiles are unavailable for one or more of the user communication devices; and in response to the HSS determining when the one or more of the individual subscriber profiles are unavailable to the one or more of the user communication devices, the HHS and the IMS element further configured to serve the IMS service to the one or more of the user communication devices based on the shared subscriber profile.

16. The IMS of claim 15 wherein the IMS element comprises an Interrogating Call State Control Function (I-CSCF).

17. The IMS of claim 15 wherein the IMS element comprises a Serving Call State Control Function (S-CSCF).

18. The IMS of claim 15 wherein the IMS element comprises a Telephony Application Server (TAS).

19. The IMS of claim 15 wherein:

the individual subscriber profiles comprise at least one of individual IMS default mandatory capabilities, individual IMS initial filter criteria, individual IMS slice information, individual IMS Multimedia Telephony (MMTEL) information, and individual IMS authentication information; and the shared subscriber profile comprises at least one of shared IMS default mandatory capabilities, shared IMS initial filter criteria, shared IMS slice information, shared IMS MMTEL information, and shared IMS authentication information.

20. The IMS of claim 15 wherein the IMS service comprises at least one of a voice calling service and a video calling service.

* * * * *